United States Patent
Turakhia (10) Patent No.: US 9,544,177 B2
(45) Date of Patent: Jan. 10, 2017

(54) SYSTEM AND METHOD FOR CONTACT MERGE MANAGEMENT

(71) Applicant: Riva FZC, Ras Al Khaimah (AE)

(72) Inventor: Bhavin Turakhia, Mumbai (IN)

(73) Assignee: Riva FZC (AE)

( * ) Notice: Subject to any disclaimer, the term of this patent is extended or adjusted under 35 U.S.C. 154(b) by 377 days.

(21) Appl. No.: 13/860,349

(22) Filed: Apr. 10, 2013

(65) Prior Publication Data

US 2014/0201279 A1    Jul. 17, 2014

(30) Foreign Application Priority Data

Jan. 17, 2013   (IN) ............................ 153/MUM/2013

(51) Int. Cl.

| | | |
|---|---|---|
| G06F 15/16 | (2006.01) | |
| G06F 17/30 | (2006.01) | |
| H04L 29/06 | (2006.01) | |
| G06F 7/36 | (2006.01) | |
| G06F 7/16 | (2006.01) | |
| G06Q 10/10 | (2012.01) | |
| H04M 1/2745 | (2006.01) | |

(52) U.S. Cl.
CPC .............. *H04L 29/06* (2013.01); *G06F 7/16* (2013.01); *G06F 7/36* (2013.01); *G06F 17/30578* (2013.01); *G06Q 10/10* (2013.01); *H04M 1/274516* (2013.01)

(58) Field of Classification Search
CPC .. G06Q 10/10; H04L 29/06; H04M 1/274516; G06F 7/16; G06F 7/36; G06F 17/30578
USPC ..................... 709/218; 707/687, 758
See application file for complete search history.

(56) References Cited

U.S. PATENT DOCUMENTS

| | | | |
|---|---|---|---|
| 7,080,104 B2 * | 7/2006 | Ring et al. | |
| 2006/0085483 A1* | 4/2006 | Mooney et al. | ............... 707/200 |
| 2011/0113073 A1* | 5/2011 | Chang | ........................... 707/803 |

(Continued)

FOREIGN PATENT DOCUMENTS

| | | | | |
|---|---|---|---|---|
| IN | 650MUMNP2006 A | | 8/2007 | |
| IN | WO 2014111950 A1 * | | 7/2014 | ............. G06Q 10/10 |

OTHER PUBLICATIONS

"International Application Serial No. PCT/IN2013/000729, International Preliminary Report on Patentability mailed Jul. 21, 2015", 11 pgs.

(Continued)

*Primary Examiner* — Aftab N. Khan
(74) *Attorney, Agent, or Firm* — Schwegman Lundberg & Woessner, P.A.

(57) ABSTRACT

In various example embodiments, a system and method for contact merge management is provided. In example embodiments, a contact management system detects that a first contact list of a first user has a first contact including a first value and a second contact including a second value. The contact management system identifies that at least one further user is associated with a further contact list that has a third contact including the first value and the second value. Based on the identifying of the third contact including the first value and the second value, the contact management system causes an automatic merge of the first contact and the second contact in the first contact list into a single contact.

20 Claims, 6 Drawing Sheets

(56) References Cited

U.S. PATENT DOCUMENTS

2013/0217365 A1* 8/2013 Ramnani ............... H04L 67/306
                                                              455/414.1

OTHER PUBLICATIONS

"International Application Serial No. PCT/IN2013/000729, International Search Report mailed Mar. 29, 2014", 8 pgs.
"International Application Serial No. PCT/IN2013/000729, Written Opinion mailed Mar. 29, 2014", 10 pgs.

* cited by examiner

SYSTEM AND METHOD FOR CONTACT MERGE MANAGEMENT

PRIORITY APPLICATION(S)

This application claims the benefit or priority under 35 U.S.C. §119(a)-(d) to Indian Application No. 153/MUM/2013, filed Jan. 17, 2013, entitled "System and Method for Contact Merge Management," which is incorporated herein by reference in its entirety.

FIELD

The present disclosure relates generally to management of address books, and in a specific example embodiment, to providing contact merge management.

BACKGROUND

Typically, users have friends and associates that are reachable via multiple networks. For example, a friend may have a Facebook account, a Gmail account, and a mobile number. The various contact information for the friend may be imported into an address book. However, each imported contact will be a separate entry in the address book. The user must then manually organize, merge, or delete contacts. Because it is such a tedious process, many users do not bother updating their address books as often as they should.

BRIEF DESCRIPTION OF DRAWINGS

Various ones of the appended drawings merely illustrate example embodiments of the present invention and cannot be considered as limiting its scope.

DETAILED DESCRIPTION

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Example embodiments described herein provide systems and methods for contact merge management. In example embodiments, a contact management system detects that a first contact list of a first user has a first contact including a first value and a second contact including a second value. The contact management system identifies that at least one further user is associated with a further contact list that has a third contact including the first value and the second value. Based on the identifying of the third contact including the first value and the second value, the contact management system causes an automatic merge of the first contact and the second contact in the first contact list into a single contact or entry.

By using embodiments of the present invention, duplicate contacts in an address book may be automatically merged without user intervention. Accordingly, one or more of the methodologies discussed herein may obviate a need for manual user review and input for each contact merge. This may have the technical effect of reducing computing resources used by one or more devices within the system. Examples of such computing resources include, without limitation, processor cycles, network traffic, memory usage, storage space, and power consumption.

Figure 1:
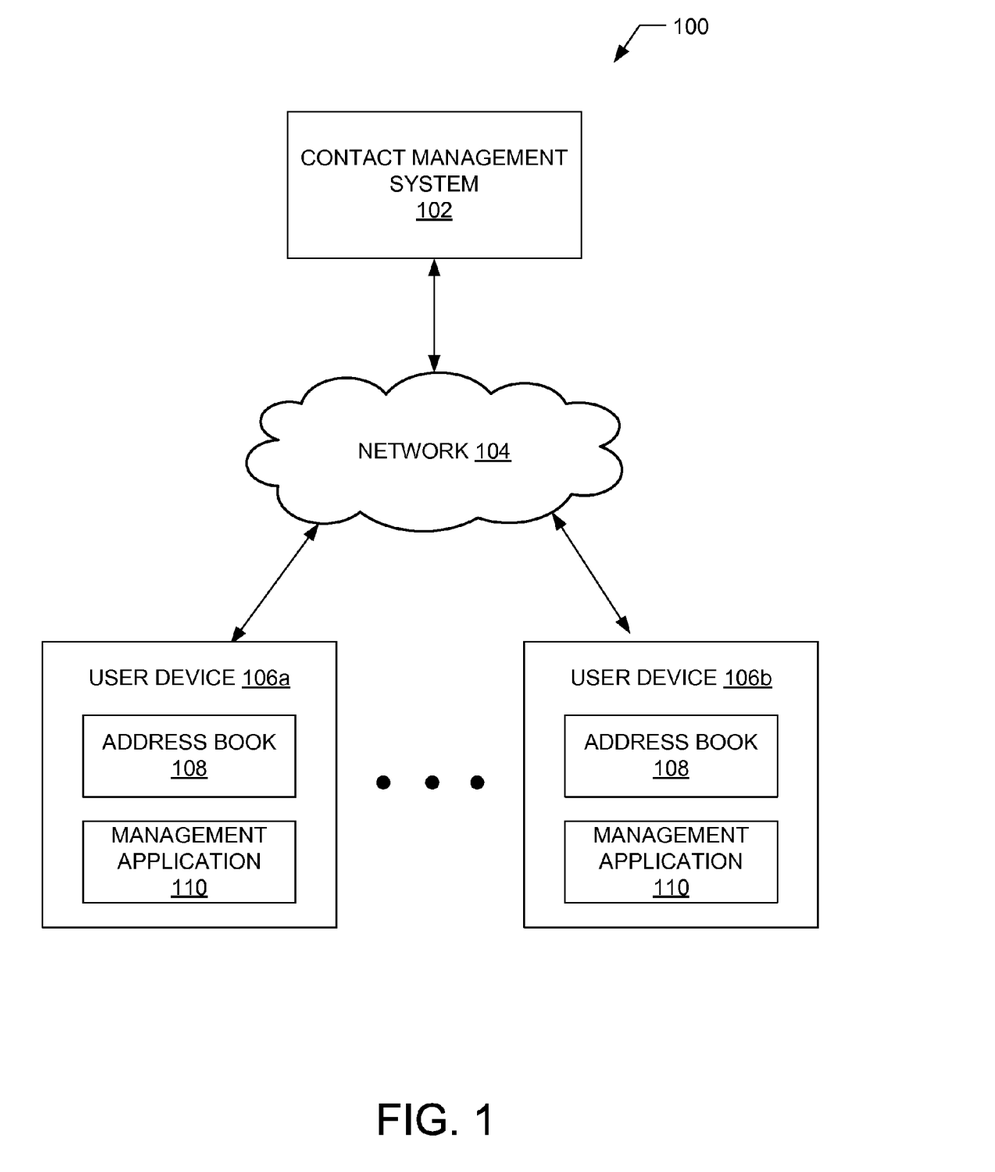
FIG. 1 is a diagram illustrating an example environment in which embodiments of a system for providing information using augmented reality may be implemented.

With reference to FIG. 1, a diagram illustrating an example environment 100 in which embodiments of a system for contact merge management is shown. The environment 100 comprises a contact management system 102 coupled via a network 104 (e.g., the Internet, wireless network, cellular network, or a Wide Area Network (WAN)) to a plurality of user devices 106 comprised of a user device 106a, a user device 106b, and the like. Each user device 106 is associated with a user that maintains an address book 108 in their user device 106. The user device 106 may comprise a mobile phone, laptop, tablet, or any other communication device that a user may utilize to store and manage the address book 108. The address book 108 comprises a data store of contact information for the user. The address book 108 is a contact list having a plurality of contacts (e.g., entries in the address book 108) whereby each contact contains one or more values of fields (e.g., address, e-mail, phone number) that enable communication with an entity of the entry. It is noted that the terms "address book" and "contact list" may be used interchangeably.

Example embodiments provide a management application 110 that is provisioned from the contact management system 102 to the user device 106. Once the management application 110 is activated on the user device 106, the management application 110 may, in some cases, import contacts from various sources and trigger the automatic merging of contacts that are duplicates. In other embodiments, the management application 110 may assess and merge contacts that are in an existing address book 108. For purposes of discussion, duplicates are contacts from different networks or sources (e.g., Facebook, Google Talk, Google, mobile) that represent the same entity. For example, Johnny Appleseed may have a social network account on Facebook: jappleseed@facebook.com as well as a chat account on Google Talk: jappleseed@gtalk.com. Conventionally, when these contacts are imported into the address book 108 on the user device 106, the contacts may be listed as two separate entries in the address book 108. The user must then manually merge the two contacts into a single contact (e.g., a single entry in the address book 108 with a Facebook value and a Google Talk value).

However, according to example embodiments, the management application 110 may trigger the automatic merging of these duplicate contacts based on, for example, at least one prior merge of these duplicate contacts by another user. For example, if the user at user device 106a merges the duplicate contacts, then the duplicate contacts in the address book 108 on user device 106b may be automatically merged by the contact management system 102 via the management application 110. In alternative embodiments, the merging may occur in the cloud (e.g., cloud computing) as opposed to on the user device 106b. The implementation details of the merge process will be discussed in more detail below.

It is noted that the environment 100 shown in FIG. 1 is exemplary. Example alternative embodiments may comprise any number of contact management systems 102 and user devices 106 in the environment 100.

Figure 2:
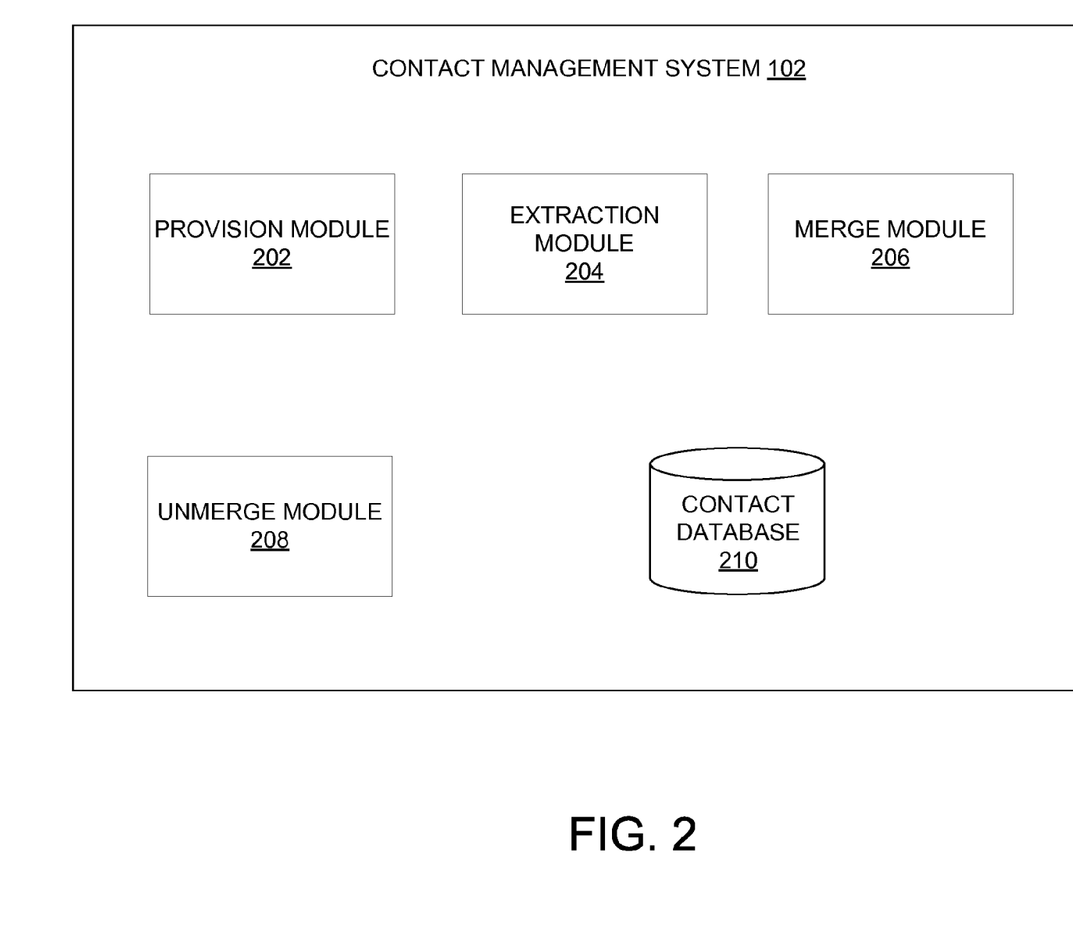
FIG. 2 is a block diagram illustrating an example embodiment of a contact management system.

Referring now to FIG. 2, a block diagram illustrating an example embodiment of the contact management system 102 is shown. The contact management system 102 provides the management application 110 to the user devices 106 and manages the automatic merge of duplicate contacts in the address books 108. To enable these operations, the contact management system 102 comprises a provision module 202, an extraction module 204, a merge module 206, an unmerge module 208, and a contact database 210 coupled in communication. Alternative embodiments may comprise more, less, or other modules for managing the automatic merge of duplicate contacts.

The provision module 202 provides the management application 110 to the user device 106. In example embodiments, the management application 110 may be downloaded by the user device 106 from the contact management system 102 via the provision module 202. The user of the user device 106 may register through the provision module 202 with the contact management system 102. Once registered, data associated with merges and unmerges in the address book 108 of the user may be stored to the contact database 210. For example, data regarding any unmerges performed by the user is stored to the contact database 210 to prevent any future merges of contacts associated with the user-unmerged contacts as will be discussed further below.

When a first user manually merges two duplicate contacts, the extraction module 204 extracts a unique value from each merged contact. Alternatively, if the first user has a single contact with more than one unique value, the extraction module 204 extracts the unique values from the single contact. The unique value is a value of a field in the contact that is unique to an entity of the contact. For example, jappleseed@facebook.com is a value of a field (e.g., social network field) that is unique to Johnny Appleseed. Similarly, jappleseed@gtalk.com is a value of a different field (e.g., chat account) that is unique to Johnny Appleseed. These are unique values since no other entity would have the same value (e.g., Facebook account identifier or Google Talk account identifier). Unique values may include, for example, e-mail address, mobile number, direct work number, and chat account identifier. Thus for the Johnny Appleseed example, the unique values jappleseed@facebook.com and jappleseed@gtalk.com are extracted by the extraction module 204.

The extracted values are then linked as a value pair by the extraction module 204 and stored to the contact database 210. In some embodiments, a counter associated with the value pair may be incremented by one in the contact database 210.

In some embodiments, other values of fields, which may not be unique values may also be extracted by the extraction module 204 and stored in association with the value pairs. These fields may include, for example, first name, last name, company of employment, general work number, home phone number, and home address. These values are not unique to an entity because the value may be shared between two or more people. For instance, more than one person may live at a particular home address having a particular home phone number and thus share these values. However, these values, while not unique to an entity, may be used as secondary verification values for confirming whether an automatic merge of contacts should occur as will be discussed further below.

The extraction module 204 continually extracts and stores value pairs and secondary verification values into the contact database 210 as users manually merge contacts in their address book or as contacts with multiple unique values are detected. As more users merge contacts or more contacts with multiple unique values are detected, the contact database 210 will become more robust and refined enabling more automatic merging of contacts.

Thus, when a new user imports contacts or otherwise triggers the management application 110 provisioned by the provision module 202, the merge module 206 may automatically merge contacts that have matching value pairs in the contact database 210. As such, the merge module 204 is a mechanism that builds on the intelligence of merges and links performed by users and applies that intelligence to automatically merge contacts for other users. As the contact management system 102 progresses, new users may not have to perform any manual merges (or fewer manual merges) and their address books are automatically organized and duplicate contacts automatically merged without any manual inputs.

In one embodiment, the merge module 206 automatically merges contacts having values that match a value pair in the contact database 210. For example, John Smith manually merges a first contact having a unique value (e.g., unique value for a field) of jappleseed@facebook.com with a second contact having a unique value of jappleseed@gtalk.com. As a result, the extraction module 204 extracts and stores the value pair jappleseed@facebook.com↔jappleseed@gtalk.com in the contact database 210. Later, Jane Doe imports contacts into her address book that includes one contact having a unique value of jappleseed@facebook.com and a second contact having a unique value jappleseed@gtalk.com. Regardless of whether Jane Doe and John Smith know each other, the merge module 206 will detect the unique values in the contacts imported by Jane Doe. The merge module 206 then looks for value pairs in the contact database 210 that include the unique values detected in Jane Doe's address book. If the merge module 206 finds a matching value pair (e.g., jappleseed@facebook.com↔jappleseed@gtalk.com), the merge module 206 automatically merges the two contacts having those unique values in Jane Doe's address book.

In another embodiment, the merge module 206 automatically merges contacts having a matching value pair in the contact database 210 when there is an additional secondary verification value in at least one of the contacts to be merged. For example, when John Smith manually merges the first contact having the unique value of jappleseed@facebook.com with a second contact having a unique value of jappleseed@gtalk.com, the extraction module 204 extracts and stores the value pair jappleseed@facebook.com↔jappleseed@gtalk.com in the contact database 210. Additionally, the first contact may indicate that the entity has a first name of Johnny The extraction module 204 may extract "Johnny" as a secondary verification value and store this value in the contact database 210 in association with the stored value pair jappleseed@facebook.com↔jappleseed@gtalk.com. Subsequently, the first contact and the second contact in Jane Doe's address book are merged if at least one of the first contact or the second contact also includes the secondary verification value. In other words, if the two contacts in Jane Does' address book have the unique values of the value pair jappleseed@facebook.com↔jappleseed@gtalk.com and at least one of the contacts include "Johnny" as a value of a field (e.g., first name field), then the two contacts may be merged. In an alternative embodiment, the merge may be performed if both contacts in Jane Doe's address book have the same secondary verification value (e.g., both have the same name), irrespective of the values in John Smith's contacts.

In a further embodiment, the merge module 206 automatically merges contacts having a matching value pair in the contact database 210 when there is a threshold number of other users that have already (e.g., manually) merged the contacts in their address books, edited the contacts in their address books to include the matching value pairs, or imported contacts with the value pair. As each user manually merges contacts having the same value pair, edit contacts to include the matching value pair, or imports contacts with the value pair, the counter in the contact database 210 may be increased by one. When the threshold number is reached or exceeded by the counter, the automatic merge of contacts may be triggered for that value pair. In one example, the threshold number may be three. Therefore, if at least three users have manually merged a contact having the unique value of jappleseed@facebook.com with a contact having a unique value of jappleseed@gtalk.com or have a contact containing these value pairs (e.g., through editing or importing), then contacts in any address book that include these values may be automatically merged.

While examples have been discussed whereby two contacts are manually merged and two contacts subsequently automatically merged, any number of contacts may be manually merged and any number of contacts may be automatically merged. For example, if John Smith merges five contacts in his address book, the extraction module 204 takes every unique value in those five contacts and creates every combination of value pairs and increases the counter for each of these value pairs. Similarly, if four different contacts in Joan Doe's address book contain corresponding matching value pairs, then the four contacts may be merged into a single contact.

As discussed above, more than one unique value may be found in a single contact. For example, the contact may have a unique social network account (e.g., jappleseed@facebook.com) and a mobile number (e.g., 1-415-620-7102) for an entity. In these cases, the extraction module 204 extracts both of the unique values from the contact and uses them to create value pairs with the value from the second contact (e.g., jappleseed@facebook.com↔jappleseed@gtalk.com and 1-415-620-7102↔jappleseed@gtalk.com). Additionally, a value pair may be created for the two values from the same contact since the two values are unique (e.g., jappleseed@facebook.com↔1-415-620-7102) and stored to the contact database 210.

When two or more contacts are automatically merged, the merge module 206 may notify the owner of the address book where the automatic merge occurred and provides an option for the owner to unmerge the contacts. In these cases, the owner may determine that two contacts were mistakenly merged and decides to unmerge them. The unmerge response is received by the unmerge module 208 and the contacts are unmerged in the address book for that particular owner. The unmerge module 208 also creates an entry in the contact database 210 indicating the owner and the value pairs that were unmerged for that owner. The entry in the contact database 210 will prevent any future automatic merges of any contacts having these value pairs in the owner's address book.

In some embodiments, when a user unmerges two contacts, the unmerge module 208 may reset or decrement (e.g., minus one from the counter) the counter associated with the value pair of the unmerged contacts. For example, the counter may be reset to zero and the contact management system 102 may require that the threshold be met or exceeded by the counter before automatic merges are triggered by the value pair again (e.g., that another three users manually merge the contacts having the values of the value pair that was unmerged).

While the contact database 210 is shown as a part of the contact management system 102, alternative embodiments may locate the contact database 210 outside but coupled to the contact management system 102. Additionally, more than one contact database 210 may be utilized.

Figure 3:
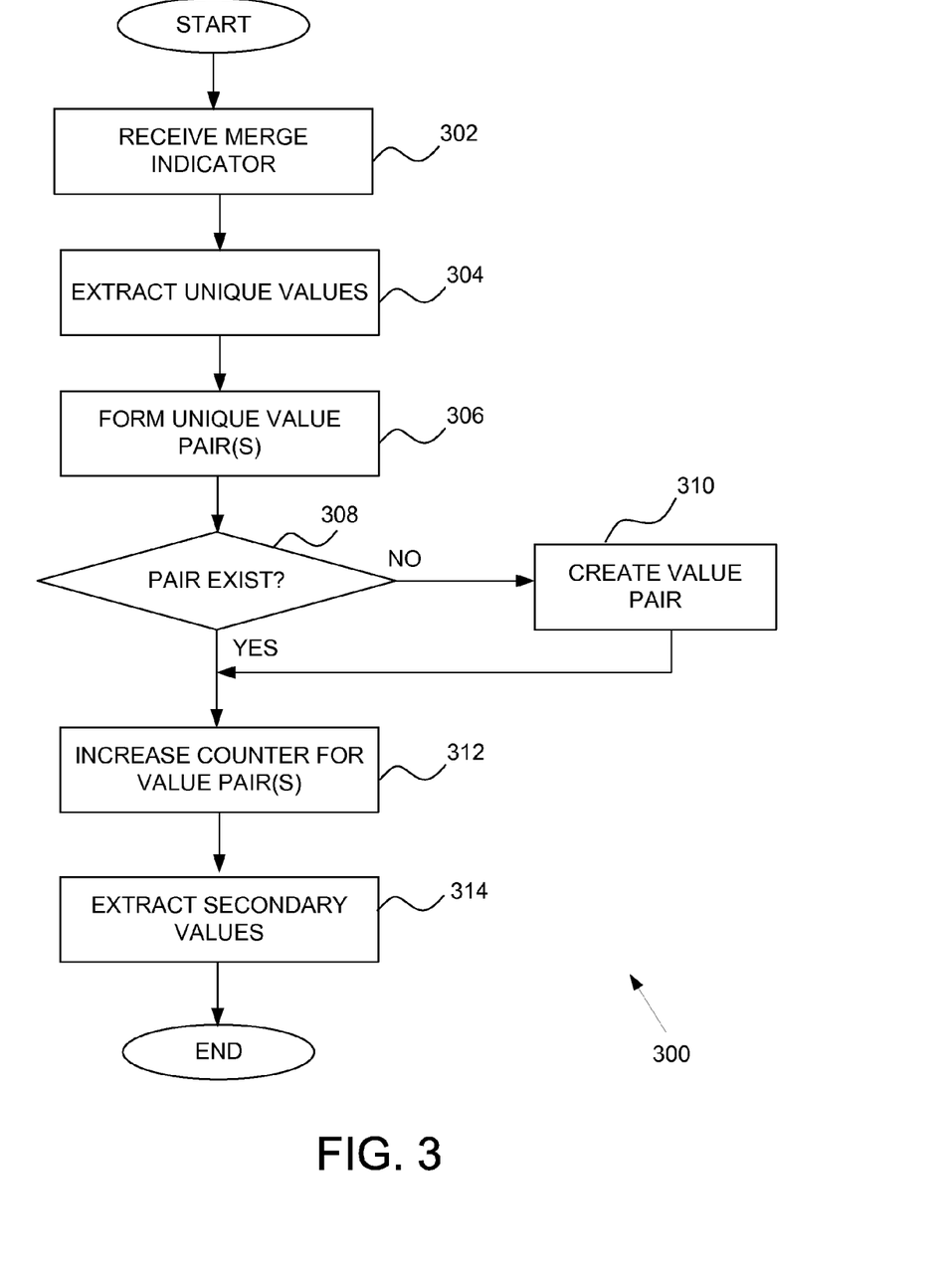
FIG. 3 is a flow diagram of an example a method for generating a database of value pairs.

Referring now to FIG. 3, a flow diagram of an example a method 300 for generating a database of value pairs is shown. In example embodiments, the method assumes that a first user (e.g., John Smith) has downloaded or otherwise installed a copy of the management application 110 on their user device 106. The first user may have some of their contacts automatically merged and may manually merge others contacts that were not automatically merged. In operation 302, the extraction module 204 receives an indication of the manual merge, edit to a single contact that results in multiple values in the single contact, or importation of the single contact with multiple values by the first user.

In operation 304, the extraction module 204 extracts one or more unique values from each merged contact or unique values in the single contact. For instance, if the first user merged two contacts together, unique values from each of the contacts are extracted. For example, if John Smith merges a first contact having a unique value of jappleseed@facebook.com with a second contact having a unique value of jappleseed@gtalk.com, the unique values jappleseed@facebook.com and jappleseed@gtalk.com are extracted by the extraction module 204.

The extracted values are then linked as a value pair by the extraction module 204 in operation 306. For example, the unique values jappleseed@facebook.com and jappleseed@gtalk.com are linked by the extraction module 204. Additionally, if more than two contacts are merged together, the extraction module 204 extracts every unique value in the plurality of contacts in operation 304 and creates every combination of value pairs in operation 306. If more than one unique value is found in a single contact, the extraction module 204 extracts each of the unique values from the single contact in operation 304 and uses each of the values to create value pairs with the value from the second (or more) contact in operation 306. For example, the contact may have a unique social network account (e.g., jappleseed@facebook.com) and a mobile number (e.g., 1-415-620-7102). In this example, the extraction module 204 extracts both of the unique values from the contact and uses them to create value pairs with the value from the second contact (e.g., jappleseed@facebook.com↔jappleseed@gtalk.com and 1-415-620-7102↔jappleseed@gtalk.com). Additionally, a value pair may be created for the two values from the same contact since the two values are unique (e.g., jappleseed@facebook.com↔1-415-620-7102) and stored to the contact database 210.

Once the value pair(s) is formed, a determination is made as to whether the value pair(s) already exists in the contact database 210. If the value pair does not exist in the contact database 310, then a value pair (e.g., value pair entry) is created in the contact database 310. A counter associated with the value pair is then incremented by one in the contact database 210 in operation 312. It is noted that in some embodiments, operation 312 may be optional.

In operation 314, other values of fields, which may not be unique values, are extracted by the extraction module 204 and associated with the value pairs. These fields may include, for example, first name, last name, company of employment, general work number, home phone number, and home address. While these values are not unique to an entity, these values may be used as secondary verification values for verifying whether an automatic merging of contacts should occur. In some embodiments, operation 314 may be optional.

Figure 4:
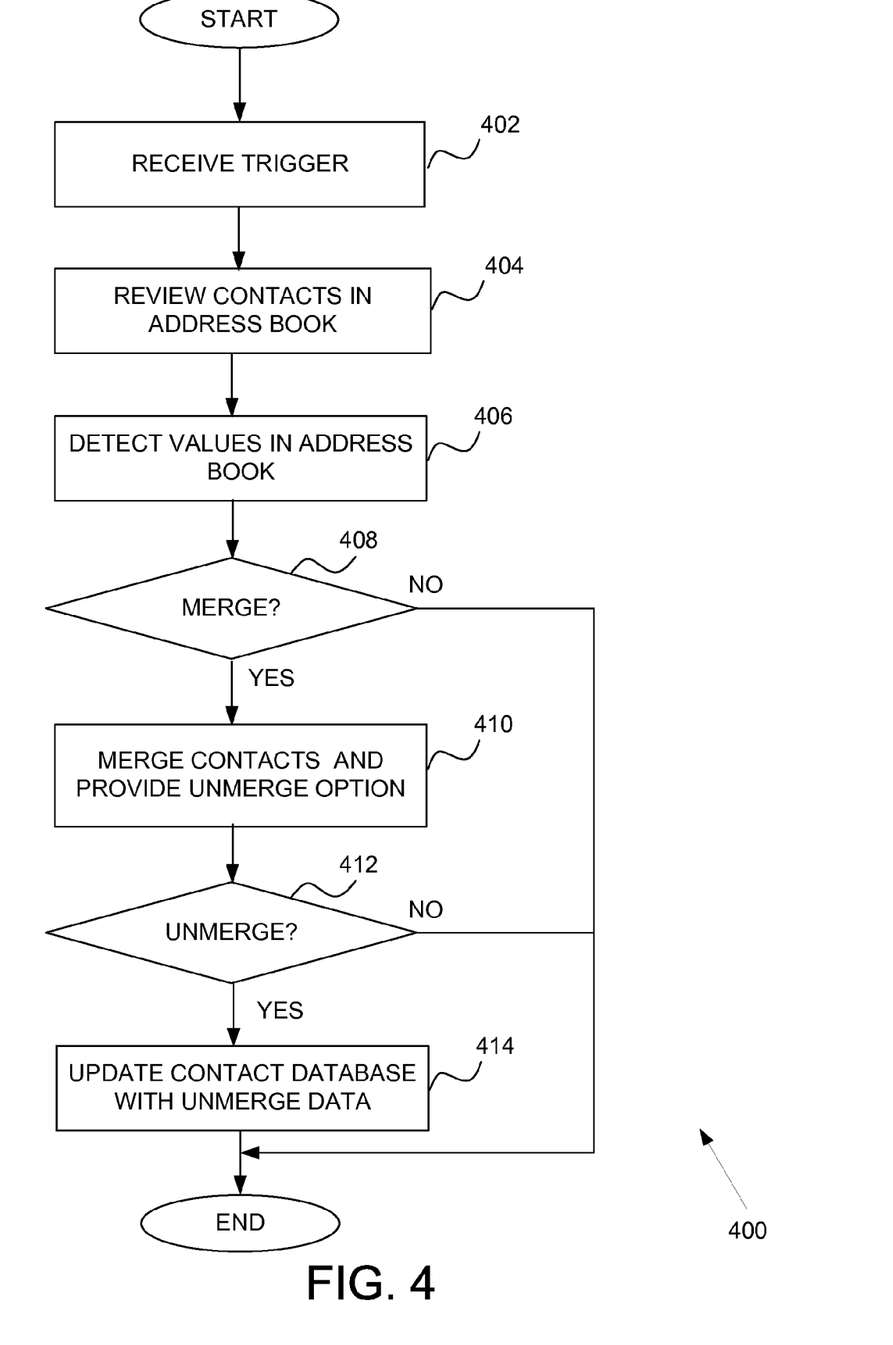
FIG. 4 is a flow diagram of an example a method for automatically merging contacts in an address book.

FIG. 4 is a flow diagram of an example a method 400 for automatically merging contacts in an address book. In operation 402, a trigger is received that initiates the automatic merge process. For example, a user may import contacts into their address book or download a copy of the management application 110 to their user device 106. These actions may trigger the automatic merge process.

In operation 404, the contacts that are in the user's address book are reviewed. In example embodiments, the merge module 206 reviews the entries or contacts in the address book and detects unique values in the contacts in operation 406. In some embodiments, once the unique values in the contacts are detected or identified, the merge module 206 forms value pair combinations with the detected values that may be matched to value pairs in the contact database 210.

In operation 408, a determination is made as to whether any of the contacts should be automatically merged. Operation 408 will be discussed in more detail in connection with FIG. 5. If a determination is made to merge at least two contacts into a single contact, then in operation 410, the at least two contacts are merged by the merge module 206. The user is notified of the merge and is provided an option to unmerge the at least two contacts by the merge module 206.

In these cases, the owner may determine that two contacts were mistakenly merged and decides to unmerge them in operation 412. The unmerge response is received by the unmerge module 208 and the contact database 210 is updated in operation 414. Thus, the unmerge module 208 may create an entry in the contact database 210 indicating the user and the value pair that were unmerged by the user. The entry in the contact database 210 will prevent any future merges of contacts with these two values of the value pair in that particular user's address book.

Figure 5:
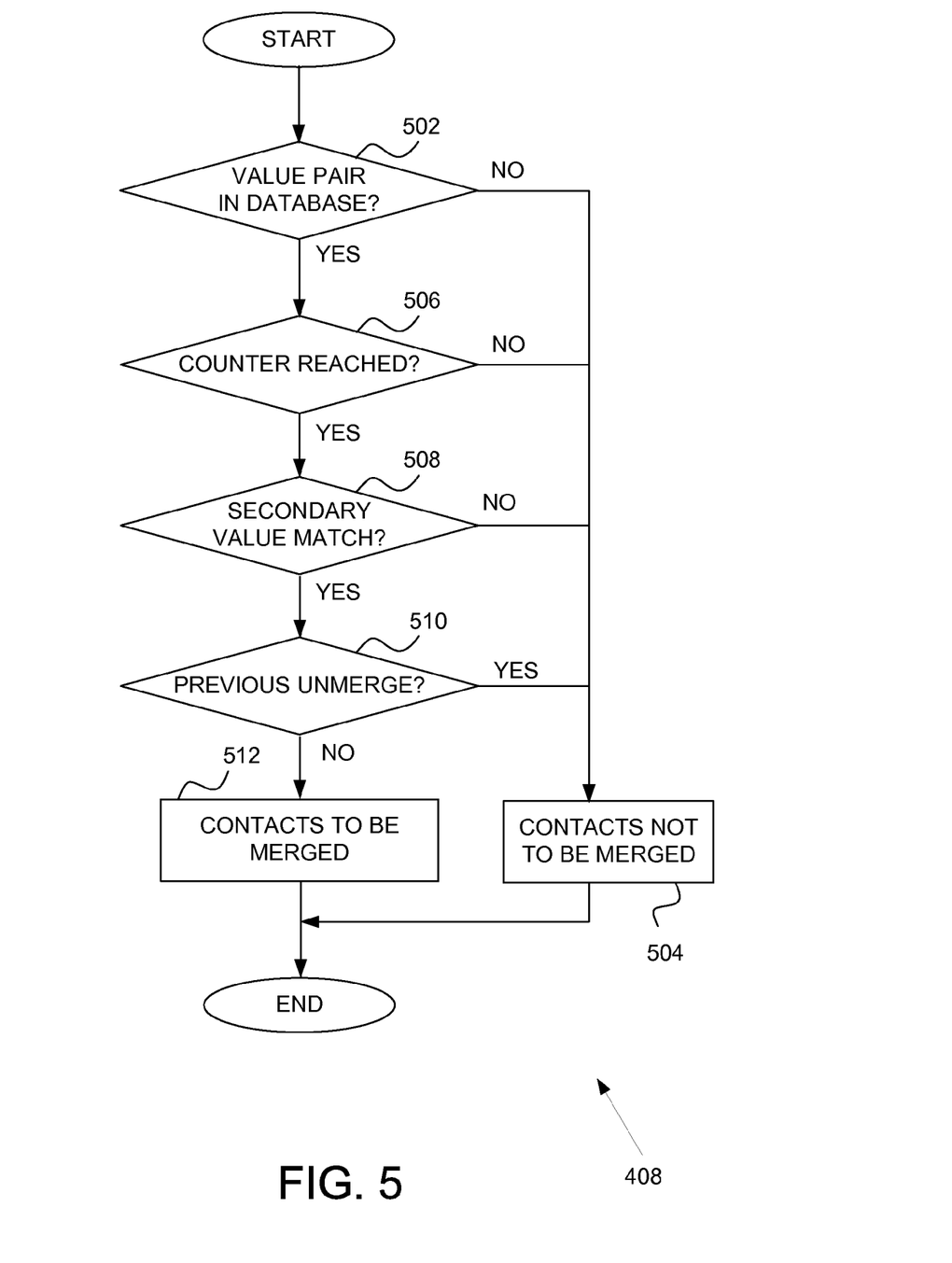
FIG. 5 is a flow diagram of an example method for determining whether to merge two contacts.

FIG. 5 is a flow diagram of an example method for determining whether to merge two contacts (operation 408). In operation 502, a determination is made as to whether values detected in the contacts of the address book form a value pair that matches a value pair in the contact database 210. For example, Jane Doe imports contacts into her address book that includes one contact having a unique value of jappleseed@facebook.com and a second contact having a unique value jappleseed@gtalk.com. If the merge module 206 finds a matching value pair (e.g., jappleseed@facebook.com↔jappleseed@gtalk.com) in the contact database 210, the merge module 206 may automatically merge the two contacts having those unique values in the user's address book. The matching value pair in the contact database 210 may be associated with at least one further user associated with a further contact list that has been identified as having the matching value pair. However, if no matching value pairs are found in the contact database 210, then the contacts are not merged in operation 504.

As an additional precaution, further criteria may be added to the automatic merging process to reduce incorrect merges. In optional operation 506, a determination is made as to whether a counter meets or exceeds a threshold number. In example embodiments, the merge module 206 may automatically merge contacts having a matching value pair in the contact database 210 when there is a particular number of other users that have already (e.g., manually) merged the contacts in their address book or otherwise have a contact with the value pair. As each user manually merges contacts having the same value pair, edits contacts to have the value pair, or imports contacts that have the value pair, the counter in the contact database 210 may be increased by one. When the threshold number is exceeded by the counter, the automatic merge of contacts may be triggered for that value pair. If the threshold is not exceeded, then the contacts are not merged in operation 504.

In optional operation 508, a determination is made as to whether a secondary verification value is present in the contacts to be merged. For example, when John Smith manually merges the first contact having the unique value of jappleseed@facebook.com with a second contact having a unique value of jappleseed@gtalk.com, the extraction module 204 extracts the unique values, creates the value pair, and stores the value pair jappleseed@facebook.com↔jappleseed@gtalk.com in the contact database 210. Additionally, the first contact may indicate that the entity has a first name of Johnny The extraction module 204 may extract "Johnny" as a secondary verification value and store this value in the contact database 210 in association with the stored value pair jappleseed@facebook.com↔jappleseed@gtalk.com. Subsequently, the first contact and the second contact in Jane Doe's address book are merged if at least one of the first contact or the second contact also includes the secondary verification value "Johnny" If the secondary verification value is not present in one of the contacts having the matching value pair, then the contacts are not merged in operation 504.

Prior to merging any two or more contacts in the address book, the merge module 206 checks to ensure that the user of the address book had not previously unmerged the same two or more values in operation 510. If the user had previously unmerged the same two or more values, then these same contacts will not be merged in operation 504. However, if the user has not previously unmerged the two or more values, then contacts having the two or more values may be merged in operation 512.

Figure 6:
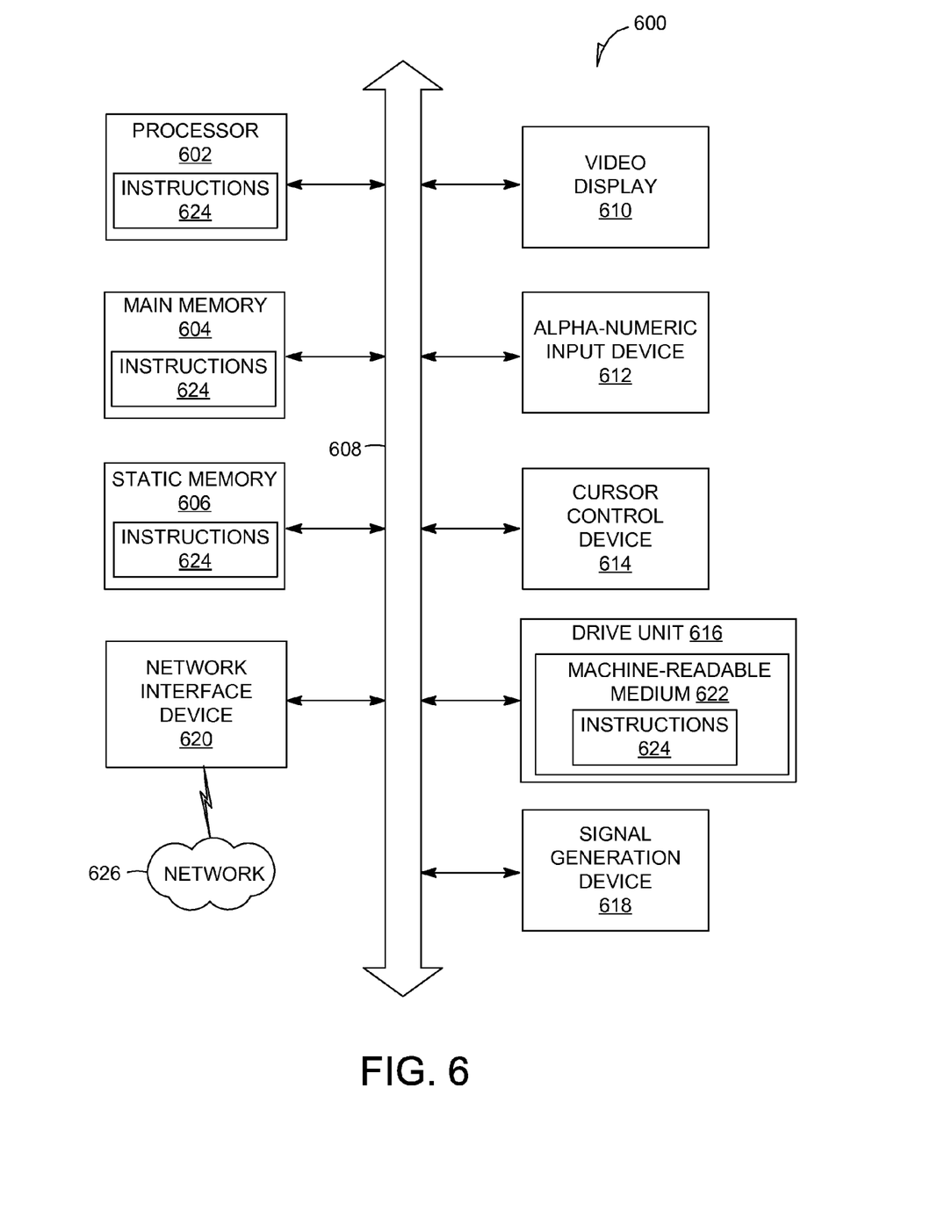
FIG. 6 is a simplified block diagram of a machine in an example form of a computing system within which a set of instructions for causing the machine to perform any one or more of the methodologies discussed herein may be executed.

FIG. 6 is a block diagram illustrating components of a machine 600, according to some example embodiments, able to read instructions from a machine-readable medium (e.g., a machine-readable storage medium) and perform any one or more of the methodologies discussed herein. Specifically, FIG. 6 shows a diagrammatic representation of the machine 600 in the example form of a computer system and within which instructions 624 (e.g., software, a program, an application, an applet, an app, or other executable code) for causing the machine 600 to perform any one or more of the methodologies discussed herein may be executed. In alternative embodiments, the machine 600 operates as a standalone device or may be connected (e.g., networked) to other machines. In a networked deployment, the machine 600 may operate in the capacity of a server machine or a client machine in a server-client network environment, or as a peer machine in a peer-to-peer (or distributed) network environment. The machine 600 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 624, sequentially or otherwise, that specify actions to be taken by that machine. Further, while only a single machine is illustrated, the term "machine" shall also be taken to include a collection of machines that individually or jointly execute the instructions 624 to perform any one or more of the methodologies discussed herein.

The machine 600 includes a processor 602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 604, and a static memory 606, which are configured to communicate with each other via a bus 608. The machine 600 may further include a graphics display 610 (e.g., a plasma display panel (PDP), a light emitting diode (LED) display, a liquid crystal display (LCD), a projector, or a cathode ray tube (CRT)). The machine 600 may also include an alpha-numeric input device 612 (e.g., a keyboard), a cursor control device 614 (e.g., a mouse, a touchpad, a trackball, a joystick, a motion sensor, or other pointing instrument), a storage unit 616, a signal generation device 618 (e.g., a speaker), and a network interface device 620.

The storage unit 616 includes a machine-readable medium 622 on which is stored the instructions 624 embodying any one or more of the methodologies or functions described herein. The instructions 624 may also reside, completely or at least partially, within the main memory 604, within the processor 602 (e.g., within the processor's cache memory), or both, during execution thereof by the machine 600. Accordingly, the main memory 604 and the processor 602 may be considered as machine-readable media. The instructions 624 may be transmitted or received over a network 626 via the network interface device 620.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 622 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 600), such that the instructions, when executed by one or more processors of the machine (e.g., processor 602), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

The instructions 624 may further be transmitted or received over a communications network 626 using a transmission medium via the network interface device 620 and utilizing any one of a number of well-known transfer protocols (e.g., HTTP). Examples of communication networks include a local area network (LAN), a wide area network (WAN), the Internet, mobile telephone networks, POTS networks, and wireless data networks (e.g., WiFi and WiMAX networks). The term "transmission medium" shall be taken to include any intangible medium that is capable of storing, encoding, or carrying instructions for execution by the machine, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising: detecting that a first contact list stored in a data store on a device of a first user has a first contact including a first value and a second contact including a second value;
identifying that a minimum number of additional users each has a contact in their respective contact list that includes both the first value and the second value, the identifying that the minimum number of additional users each has the contact in their respective contact list that includes both the first value and the second value comprising:
    incrementing a counter based on detecting in the contact list of the additional users one or more of a manual merge of the first value and second value into the contact, edit of the contact to include the first value and second value, or import of the contact that includes the first value and second value; and
    based on determining that a threshold number is transgressed based on the counter, causing, by a processor an automatic merge of the first contact and the second contact in the first contact list into a single contact in the first contact list, the merge causing an update to the data store on the device of the first user.

2. The method of claim 1, wherein the contact in the contact list of at least some of the additional users was formed as a result of a previous merge performed on the second contact list.

3. The method of claim 1, further comprising determining that the threshold number is transgressed based on the counter.

4. The method of claim 1, further comprising:
determining that a second user has unmerged a third contact that includes the first value and the second value into a first previously existing contact having the first value and a second previously existing contact having the second value; and
preventing an automatic merge of a fourth contact having the first value and a fifth contact having the second value for the second user based on the determining.

5. The method of claim 1, wherein the first value and the second value are values that uniquely identify an entity.

6. The method of claim 5, wherein the first value and the second value comprise a selection of at least one from the group consisting of a mobile number, a chat account identifier, an e-mail address, a phone number, a user handle, a name, and an address.

7. The method of claim 1, further comprising, prior to the causing of the automatic merge, verifying that a third value is associated with at least two of the first contact, the second contact, or a contact in the contact list of at least one of the additional users.

8. The method of claim 7, wherein the third value is a name.

9. The method of claim 7, wherein the verifying comprises verifying that the third value is associated with both the first contact and the second contact.

10. A machine-readable storage medium having non-transitory signals and storing instructions which, when executed by the at least one processor of a machine, cause the machine to perform operations comprising:
detecting that a first contact list stored in a data store on a device of a first user has a first contact including a first value and a second contact including a second value;
identifying that a minimum number of additional users each has a contact in their respective contact list that includes both the first value and the second value, the identifying that the minimum number of additional users each has the contact in their respective contact list that includes both the first value and the second value comprising:
incrementing a counter based on detecting in the contact list of the additional users one or more of a manual merge of the first value and second value into the contact, edit of the contact to include the first value and second value, or import of the contact that includes the first value and second value; and
based on determining that a threshold number is transgressed based on the counter causing an automatic merge of the first contact and the second contact in the first contact list into a single contact in the first contact list, the merge causing an update to the data store on the device of the first user.

11. The machine-readable storage medium of claim 10, wherein the contact in the contact list of at least some of the additional users was formed as a result of a previous merge performed on the second contact list.

12. The machine-readable storage medium of claim 10, wherein the operations further comprise determining that the threshold number is transgressed based on the counter.

13. The machine-readable storage medium of claim 10, further comprising:
determining that a second user has unmerged a third contact that includes the first value and the second value into a first previously existing contact having the first value and a second previously existing contact having the second value; and
preventing an automatic merge of a fourth contact having the first value and a fifth contact having the second value for the second user based on the determining.

14. The machine-readable storage medium of claim 10, wherein the operations further comprise, prior to the causing of the automatic merge, verifying that a third value is associated with at least two of the first contact, the second contact, or a contact in the contact list of at least one of the additional users.

15. The machine-readable storage medium of claim 14, wherein the third value is a name.

16. The machine-readable storage medium of claim 14, wherein the verifying comprises verifying that the third value is associated with both the first contact and the second contact.

17. A system comprising:
one or more processors of a machine; and
a merge module to configure the one or more processors to perform operations including: detecting that a first contact list stored in a data store on a device of a first user has a first contact including a first value and a second contact including a second value,
identifying that a minimum number of additional users each has a contact in their respective contact list that includes both the first value and the second value, the identifying that the minimum number of additional users each has the contact in their respective contact list that includes both the first value and the second value comprising:
incrementing a counter based on detecting in the contact list of the additional users one or more of a manual merge of the first value and second value into the contact, edit of the contact to include the first value and second value, or import of the contact that includes the first value and second value; and
based on determining that a threshold number is transgressed based on the counter, causing an automatic merge of the first contact and the second contact in the first contact list into a single contact in the first contact list, the merge causing an update to the data store on the device of the first user.

18. The system of claim 17, further comprising an unmerge module configuring the one or more processors to determine that a second user has unmerged a third contact that includes the first value and the second value into a first previously existing contact having the first value and a second previously existing contact having the second value, and
prevent an automatic merge of a fourth contact having the first value and a fifth contact having the second value for the second user based on the determining.

19. The system of claim 17, wherein the operations further comprise determining that a threshold number is transgressed based on the counter.

20. The system of claim 17, wherein the merge module is further to configure the one or more processors to verify, prior to the causing of the automatic merge, that a third value is associated with at least two of the first contact, the second contact, or a contact in the contact list of at least one of the additional users.

* * * * *

UNITED STATES PATENT AND TRADEMARK OFFICE
CERTIFICATE OF CORRECTION

PATENT NO. : 9,544,177 B2  
APPLICATION NO. : 13/860349  
DATED : January 10, 2017  
INVENTOR(S) : Bhavin Turakhia Page 1 of 1

It is certified that error appears in the above-identified patent and that said Letters Patent is hereby corrected as shown below:

In the Specification

In Column 4, Line 20, delete "204" and insert --206-- therefor

In Column 4, Line 62, delete "Johnny" and insert --Johnny.-- therefor

In Column 5, Line 4, delete "Does'" and insert --Doe's-- therefor

In Column 7, Line 7, delete "310," and insert --210,-- therefor

In Column 7, Line 8, delete "310." and insert --210.-- therefor

In Column 8, Line 34, delete "Johnny" and insert --Johnny.-- therefor

In Column 8, Line 42, delete ""Johnny"" and insert --"Johnny."-- therefor

In the Claims

In Column 12, Line 59, in Claim 1, delete "processor" and insert --processor,-- therefor Signed and Sealed this  
Third Day of April, 2018

Andrei Iancu  
*Director of the United States Patent and Trademark Office*